United States Patent
Richards et al.

(10) Patent No.: US 11,781,475 B2
(45) Date of Patent: Oct. 10, 2023

(54) PRIME MOVER SYSTEMS INCLUDING MULTI-ACCESSORY DRIVES AND METHODS OF CONTROLLING SAME

(71) Applicant: Cummins Inc., Columbus, IN (US)

(72) Inventors: Kieran J. Richards, West Haddon (GB); David George Sharpe, Daventry (GB)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/930,437

(22) Filed: Sep. 8, 2022

(65) Prior Publication Data
US 2023/0003167 A1    Jan. 5, 2023

Related U.S. Application Data

(60) Division of application No. 16/194,499, filed on Nov. 19, 2018, now Pat. No. 11,441,479, which is a
(Continued)

(51) Int. Cl.
*F02B 67/06* (2006.01)
*F16D 27/112* (2006.01)
(Continued)

(52) U.S. Cl.
CPC ............. *F02B 67/06* (2013.01); *F16D 13/76* (2013.01); *F16D 27/04* (2013.01); *F16D 27/112* (2013.01);
(Continued)

(58) Field of Classification Search
CPC .......... F02B 67/06; F16D 13/76; F16D 27/04; F16D 27/112; F16D 27/14;
(Continued)

(56) References Cited

U.S. PATENT DOCUMENTS

| 2,644,905 A | 7/1953 | Brueder |
| 4,347,473 A | 8/1982 | Stroud |
| (Continued) | | |

FOREIGN PATENT DOCUMENTS

| EP | 0301704 | 2/1989 |
| EP | 0587273 | 3/1994 |
| (Continued) | | |

OTHER PUBLICATIONS

Chinese Office Action from Counter Chinese Application, CN Serial No. 201780032398.5, 8 pgs., dated Mar. 4, 2020.
(Continued)

*Primary Examiner* — Justin Holmes
(74) *Attorney, Agent, or Firm* — Taft Stettinius & Hollister LLP

(57) ABSTRACT

One embodiment is a system comprising an internal combustion engine including an output shaft, a pulley system structured to be driven by the output shaft, a first alternator and a second alternator structured to be driven by the pulley system, and an electromagnetic clutch integrated within one of the pulley system, the first alternator and the second alternator and structured to selectably couple and decouple at least one of the first alternator and the second alternator from the output shaft. The system includes a controller in operative communication with the internal combustion engine system and structured to evaluate power demand and power production capability parameters of the system and to control the electromagnetic clutch to engage or disengage in response to the evaluation.

14 Claims, 11 Drawing Sheets

Related U.S. Application Data continuation of application No. PCT/US2017/033779, filed on May 22, 2017.

(60) Provisional application No. 62/342,238, filed on May 27, 2016.

(51) Int. Cl.
  *F16D 13/76* (2006.01)
  *F16D 27/04* (2006.01)
  *F16D 27/14* (2006.01)
  *H02J 7/14* (2006.01)
  *F16H 55/36* (2006.01)
  *H02P 101/45* (2016.01)

(52) U.S. Cl.
  CPC ............ *F16D 27/14* (2013.01); *H02J 7/1423* (2013.01); *F16D 2300/12* (2013.01); *F16H 55/36* (2013.01); *H02P 2101/45* (2015.01)

(58) Field of Classification Search
  CPC .... F16D 2300/12; H02J 7/1423; F16H 55/36; H02P 2101/45; Y02T 10/12
  See application file for complete search history.

(56) References Cited

U.S. PATENT DOCUMENTS

| | | | |
|---|---|---|---|
| 4,564,092 A | 1/1986 | Pierce | |
| 4,757,249 A | 7/1988 | Farber et al. | |
| 4,846,327 A | 7/1989 | Mayer | |
| 5,097,194 A | 3/1992 | Walton et al. | |
| 5,156,573 A | 10/1992 | Bytzek | |
| 5,254,936 A * | 10/1993 | Leaf | H02P 9/30 322/90 |
| 5,392,889 A | 2/1995 | Koitabashi | |
| 5,600,232 A * | 2/1997 | Eavenson, Sr. | H02J 7/1423 322/12 |
| 5,739,676 A | 4/1998 | Judge et al. | |
| 7,798,928 B2 | 9/2010 | Serkh | |
| 8,408,188 B1 | 4/2013 | Hormilla | |
| 8,844,701 B2 | 9/2014 | Pardee | |
| 9,543,874 B2 * | 1/2017 | Hakeem | H02P 9/48 |
| 2006/0154763 A1 | 7/2006 | Serkh | |
| 2006/0254565 A1 | 11/2006 | Bottcher et al. | |
| 2013/0008758 A1 | 1/2013 | Komorowski | |
| 2014/0084594 A1 * | 3/2014 | Marchand | F02B 63/044 290/1 A |
| 2014/0144745 A1 | 5/2014 | Greene | |
| 2014/0174873 A1 | 6/2014 | Quin | |
| 2015/0041277 A1 | 2/2015 | Boyers et al. | |
| 2015/0060229 A1 | 3/2015 | Takahashi et al. | |
| 2015/0129388 A1 | 5/2015 | Tilly et al. | |

FOREIGN PATENT DOCUMENTS

| | | | |
|---|---|---|---|
| EP | 0652626 | 5/1995 | |
| FR | 2486610 A * | 1/1982 | ............. F02B 67/06 |
| GB | 2192677 | 1/1988 | |
| JP | S5743029 | 3/1982 | |
| JP | H0595637 | 4/1993 | |
| KR | 20100038810 | 4/2010 | |
| KR | 20120059698 | 6/2012 | |
| WO | WO-2008050046 A2 * | 5/2008 | ............. F02B 67/06 |
| WO | 2010079386 | 7/2010 | |

OTHER PUBLICATIONS

Translation of Chinese Office Action from Counter Chinese Application, CN Serial No. 201780032395.5, 9 pgs., dated Mar. 4, 2020.
International Search Report and Written Opinion, PCT Appln. No. PCT/US2017/033779, dated Sep. 22, 2017, 18 pgs., dated Sep. 22, 2017, 18 pgs.
Extended EP Search Report, EP Appln. No. 1780335 dated Dec. 6, 2019, 8 pgs., dated Nov. 27, 2019 00:00:00.0.

* cited by examiner

PRIME MOVER SYSTEMS INCLUDING MULTI-ACCESSORY DRIVES AND METHODS OF CONTROLLING SAME

CROSS-REFERENCE

The present application is a divisional of U.S. patent application Ser. No. 16/194,499, filed Nov. 19, 2018 which is a continuation of PCT Application No. PCT/US17/33779 filed on May 22, 2017, which claims priority to and the benefit of U.S. Application No. 62/342,238, filed May 27, 2016 the disclosures of which are hereby incorporated by reference.

BACKGROUND

The present application relates generally to engine systems and other prime mover systems including multiple accessory drives such as multiple alternator drives as well as to methods of controlling such systems. Modern prime movers, such as internal combustion engines, electric prime mover systems, hybrid internal combustion engine systems including hybrid electric systems and hybrid pneumatic systems, and automotive applications thereof, such as high power haul trucks, are increasingly requiring more and more electrical and mechanical power for ancillary loads and accessories. For example, many engine systems require emissions treatment equipment, such as selective catalytic reduction (SCR) systems and related components such as electrically heated diesel emissions fluid dosing components and catalyst heaters. Electrification of prime mover system accessories such as compressors, fans, pumps and other mechanical loads puts an increasing demand on electrical systems associated therewith. Furthermore, engine and other prime mover systems are experiencing ever increasing needs for multiple and differently configured accessory drives operable to provide rotational force in the form of torque applied to different types of mechanical loads. These and other systems put an increasing demand on the alternator at certain times during the duty cycle and can mean that existing alternators cannot output the electrical power required. Similarly, customers may prefer to have greater output for comfort and ancillary items in the cab such as global positioning system (GPS), heating, ventilation, air-conditioning and refrigeration (HVACR) systems and other power drawing devices. Many engine applications including, for example, high horsepower (HHP) off road haul trucks used in the mining industry are becoming increasingly more reliant on electrical power due to the range of ancillary loads that they now have to power during service. This increases power draw from the batteries and in turn the alternator of the haul truck engine, therefore requiring larger output alternators and controls effective to ensure that the electrical output needed is being met by the engine. Present approaches to providing increased electrical power suffer from a number of drawbacks and disadvantages. There remains a significant unmet need for the unique apparatuses, methods and systems disclosed herein.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

One embodiment is a unique multi-accessory drive system. In certain forms the multi-accessory drive system comprises a multi-alternator drive system. Another embodiment is a unique method of controlling a multi-accessory drive system. In certain forms the method controls a multi-alternator drive system. Further embodiments, forms, objects, features, advantages, aspects, and benefits shall become apparent from the following description and drawings.

DETAILED DESCRIPTION OF ILLUSTRATIVE EMBODIMENTS

Figure 1:
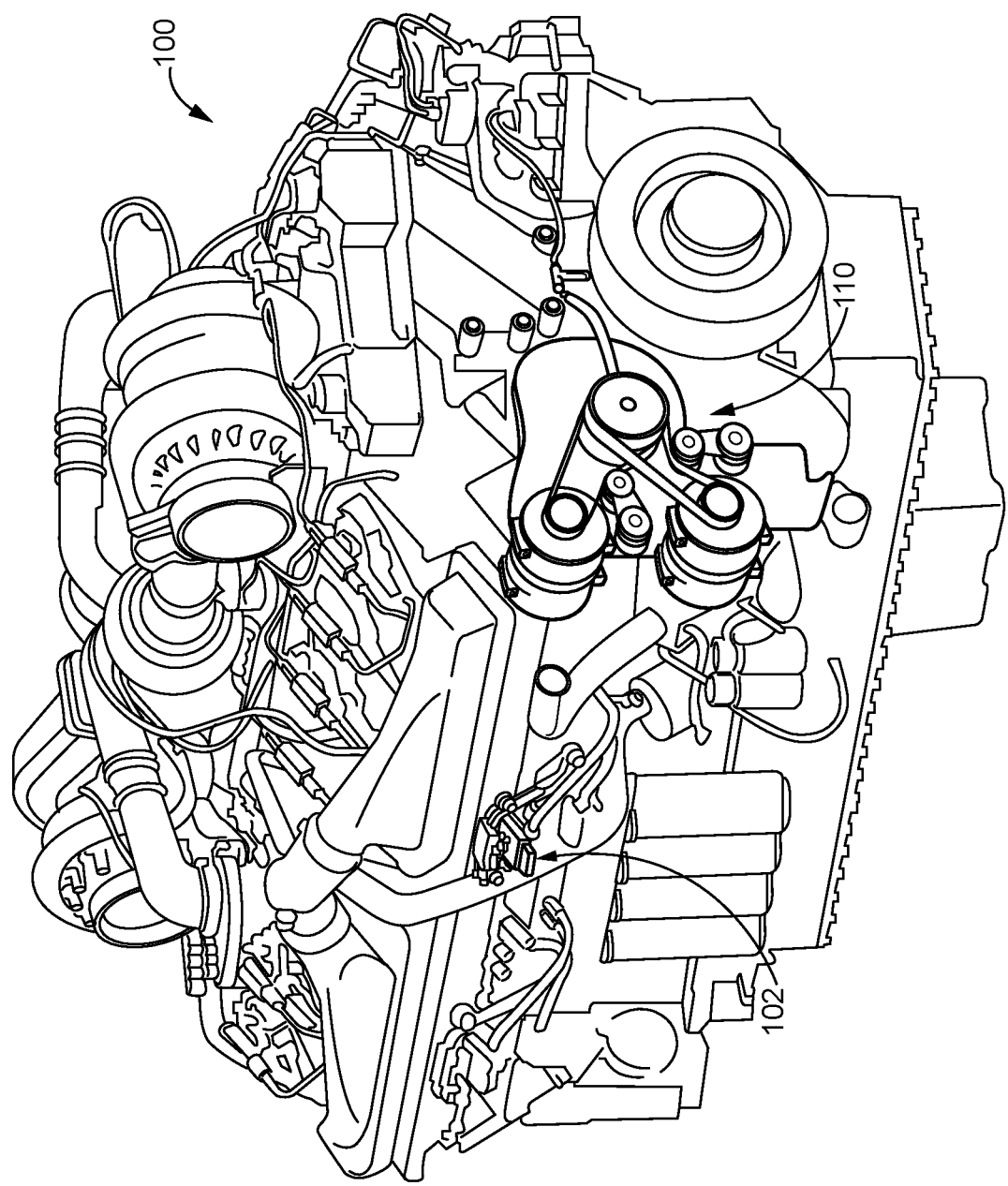
FIG. 1 is a perspective view of an exemplary prime mover system including a multi-accessory drive system.
Figure 2:
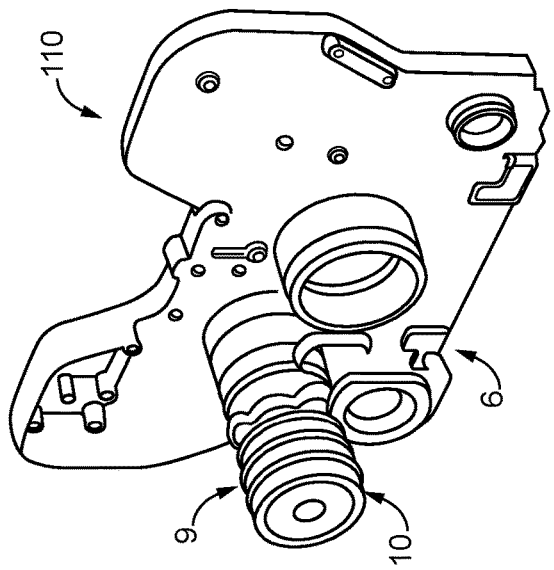
FIG. 2 is a top view illustrating of portions of a multi-accessory drive system according to one exemplary embodiment.
Figure 3:
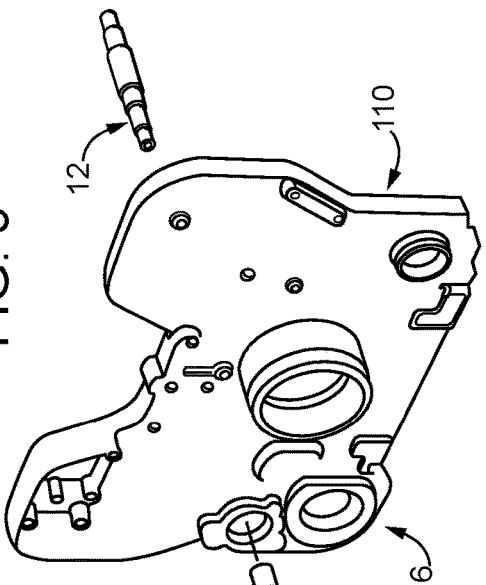
FIG. 3 is a perspective view of the embodiment of FIG. 2
Figure 4:
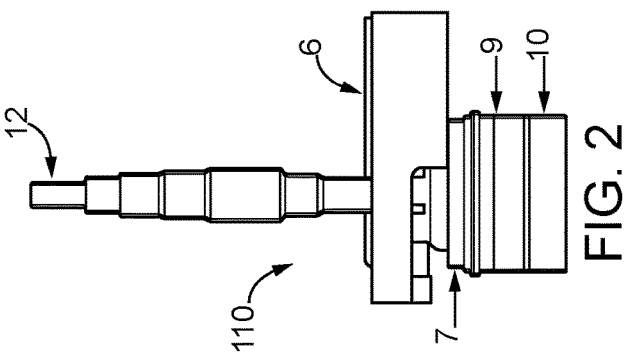
FIG. 4 is an exploded perspective view of the embodiment of FIG. 2.
Figure 4:
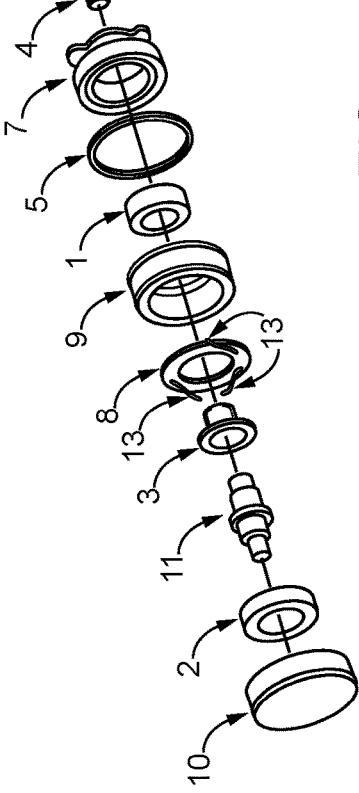
Figure 6:
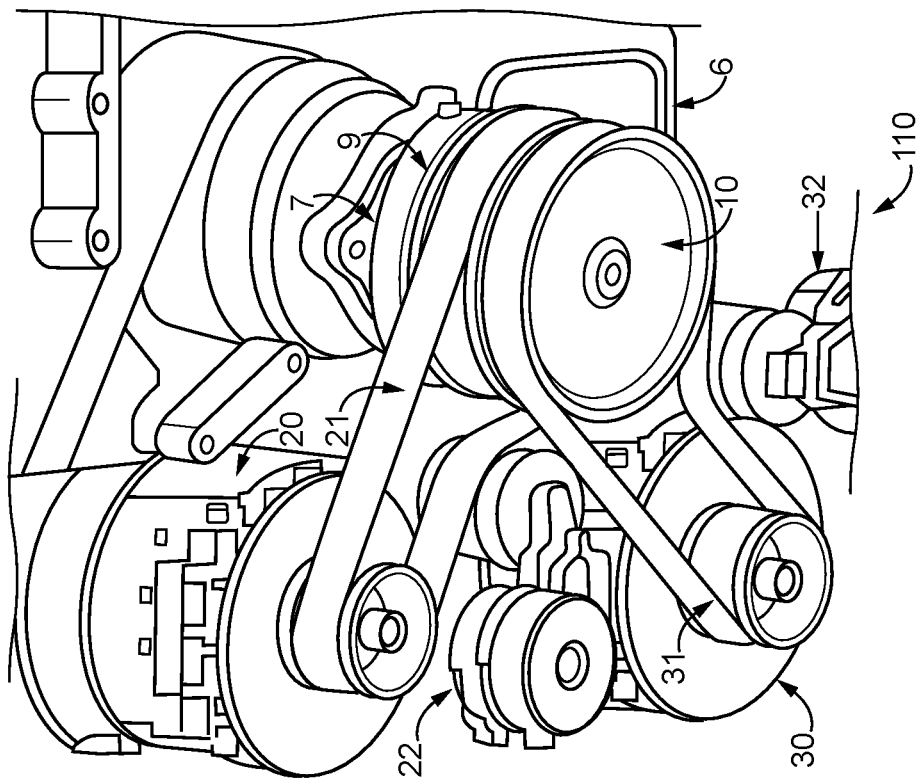
FIG. 6 is a perspective view of a portion of the embodiment of FIG. 2.
Figure 5:
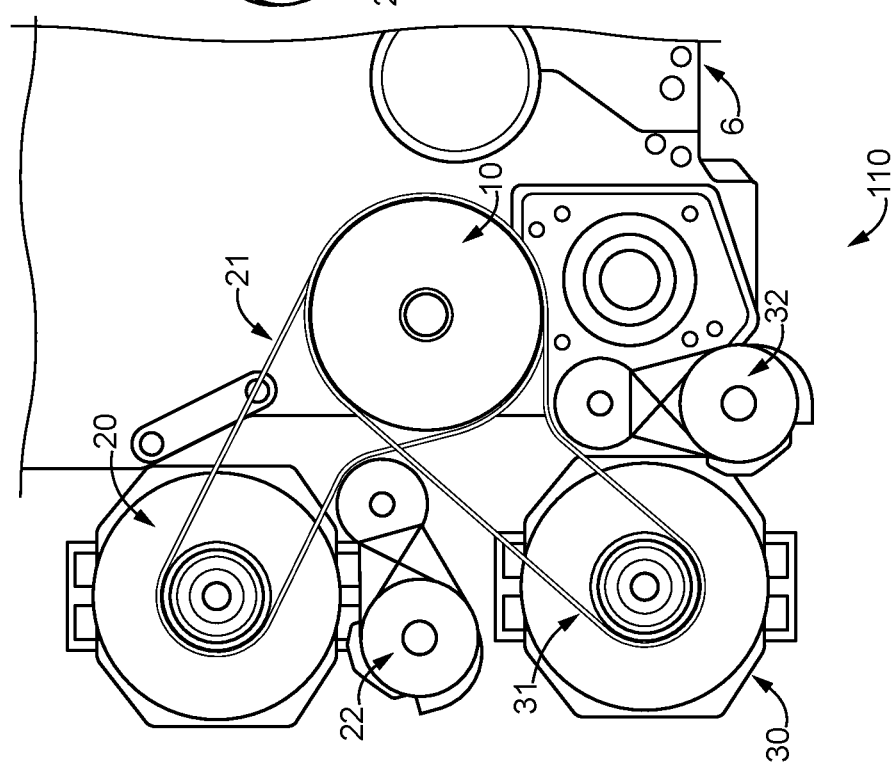
FIG. 5 is a front view of a portion of the embodiment of FIG. 2.
Figure 7C:
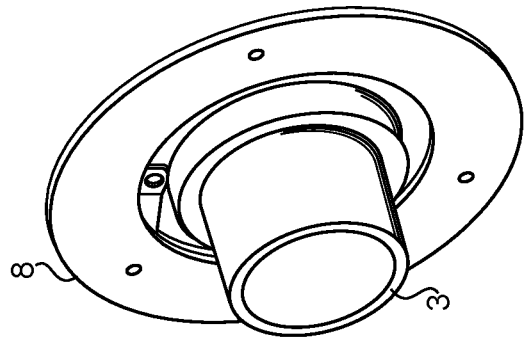
FIGS. 7A, 7B, and 7C are perspective views of certain components of the embodiment of FIG. 2.
Figure 7B:
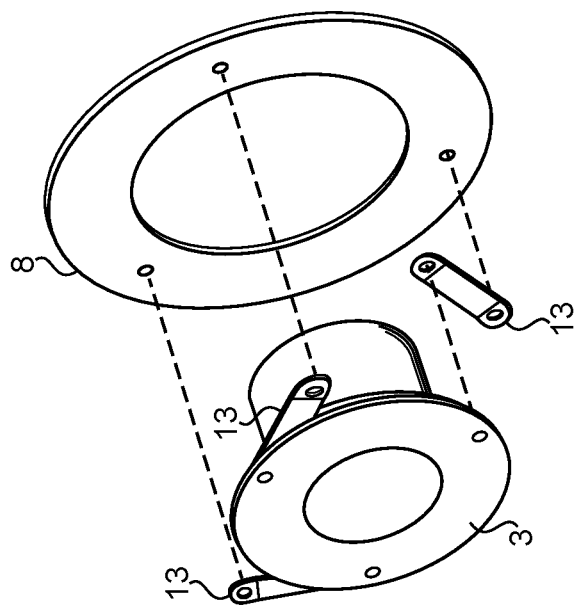
Figure 7A:
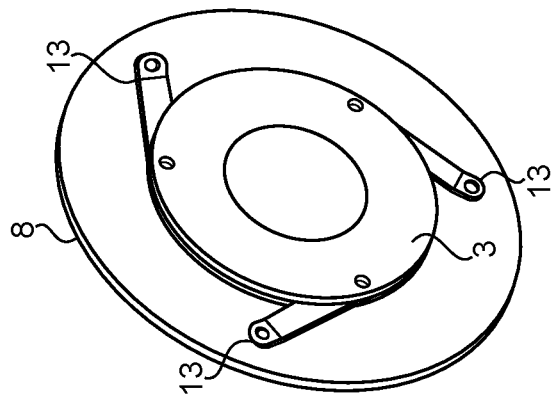
Figure 8:
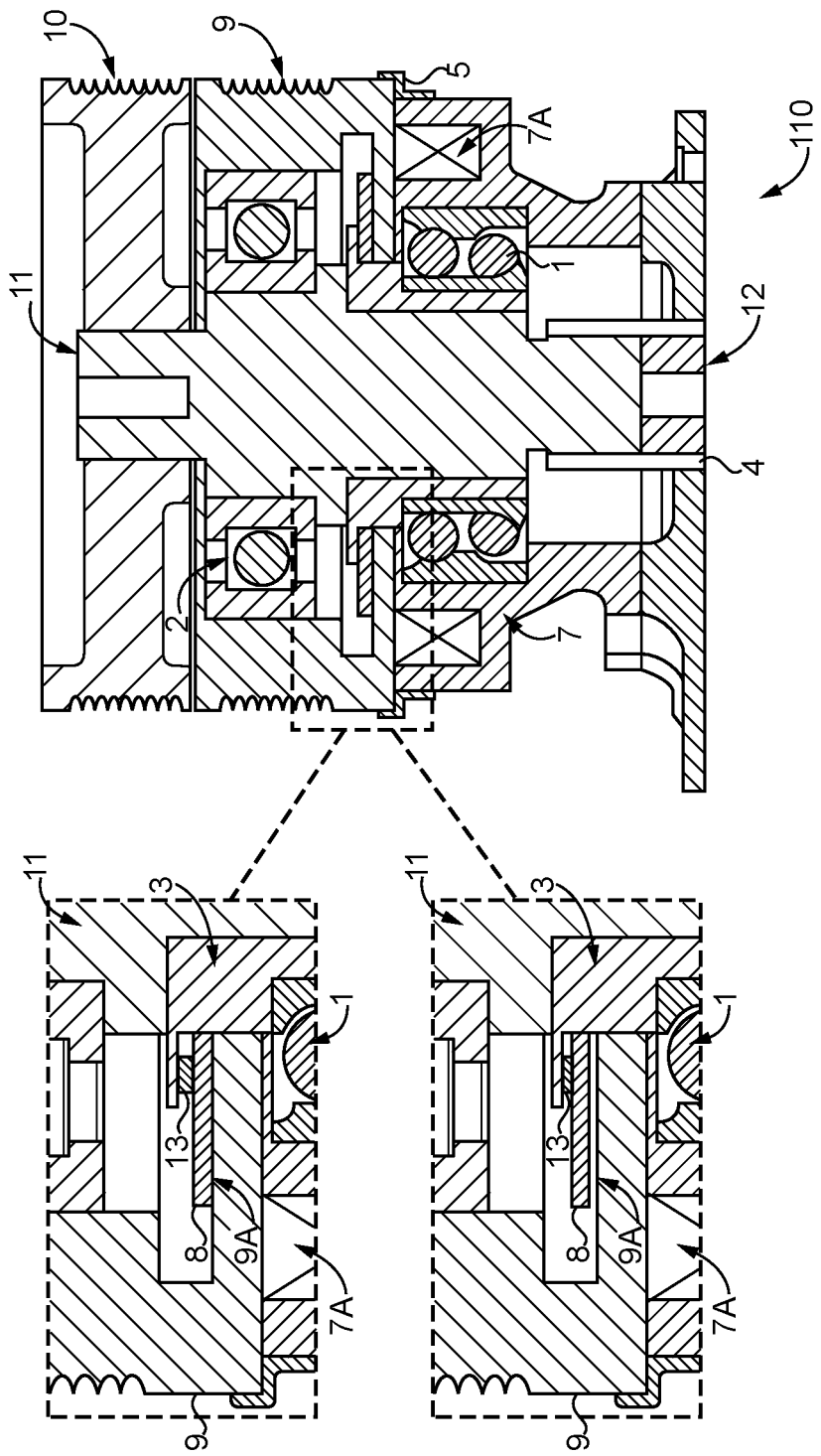
FIG. 8 is a sectional view of a portion of the embodiment of FIG. 2 with enlarged portions also depicted.

With reference to FIG. 1 there is illustrated an exemplary prime mover system including an internal combustion engine 100 and an exemplary multi-accessory drive system 110. In the illustrated embodiment, the prime mover system is provided as an internal combustion engine (ICE) system. It shall be appreciated that in certain embodiments the prime mover system may be provided in other forms such as a hybrid electric-ICE system, a hybrid pneumatic-ICE system or an electrical machine drive system. Engine 100 is illustrated as a high horsepower (HHP) engine suitable for high horsepower applications such as mining vehicles, however, a variety of other types of engines and prime mover applications are also contemplated in other embodiments. In the illustrated embodiments, multi-accessory drive system 110 is provided as an electrical power generation system in a particular dual-alternator form, but it shall be appreciated that systems including different numbers and configurations of alternators and/or different types of rotary driven accessories utilizing the features disclosed herein are also contemplated in other embodiments. Further examples of such rotary driven accessories include air compressors, pumps and other rotating-load accessories which have variable load or duty cycles or are needed only under certain operating conditions of a prime mover system.

Electronic control unit (ECU) 102 is in operative communication with engine 100 and system 110 to receive information from and provide commands to a variety of controlled components and systems including those described in connection with FIG. 11. ECU 102 is one example of an electronic control system component which may be utilized in controlling engine 100 and system 110. It shall be appreciated that ECU 102 may be a unitary control device or a combination of multiple devices and may operate in conjunction with communication links or busses, and a variety of sensors and other electronic devices.

Referring now additionally to FIGS. 2-8 there are illustrated several views of various aspects of multi-accessory drive system 110. It shall be appreciated that the illustrated embodiment provides one example of a form in which system 110 may be provided. System 110 is driven by a prime mover output shaft 12 which is coupled with and driven by a prime mover such as engine 100. In the illustrated form, prime mover shaft 12 is a water pump shaft, but it shall be appreciated that a variety of other prime mover output shafts may be utilized in other embodiments. Prime mover shaft 12 is coupled with coupling spline 4 which is, in turn coupled with drive shaft 11. Drive shaft 11 is coupled with fixed rotary accessory drive member 10, which is provided as a fixed pulley in the illustrated form, and is also in contact with angular contact bearing 1 and cylindrical roller bearing 2. During operation prime mover shaft 12, coupling spline 4, drive shaft 11 and rotary accessory drive member 10 rotate together in a substantially fixed relationship and are operable to drive belt 31 which, in turn drives alternator 30 while tensioner 32 maintains appropriate tension of belt 31. In this manner alternator 30 generates electrical power correlated with the operational speed of engine 100. It shall be appreciated that the pulley form of rotary accessory drive member 10 is one example of a rotary accessory driving member. In certain embodiments, rotary accessory drive member 10 may be provided and structured as another type of rotary accessory drive such as a driving gear, a chain drive member or a direct drive member. In each instance rotary accessory drive member 10 may have the internal attributes and structures disclosed herein. It shall be further appreciated that rotary accessory drive member 10, as well as the other types of rotary drives, may be provided and structured to drive other types of loads such as compressors, fans or pumps.

Figure 14:
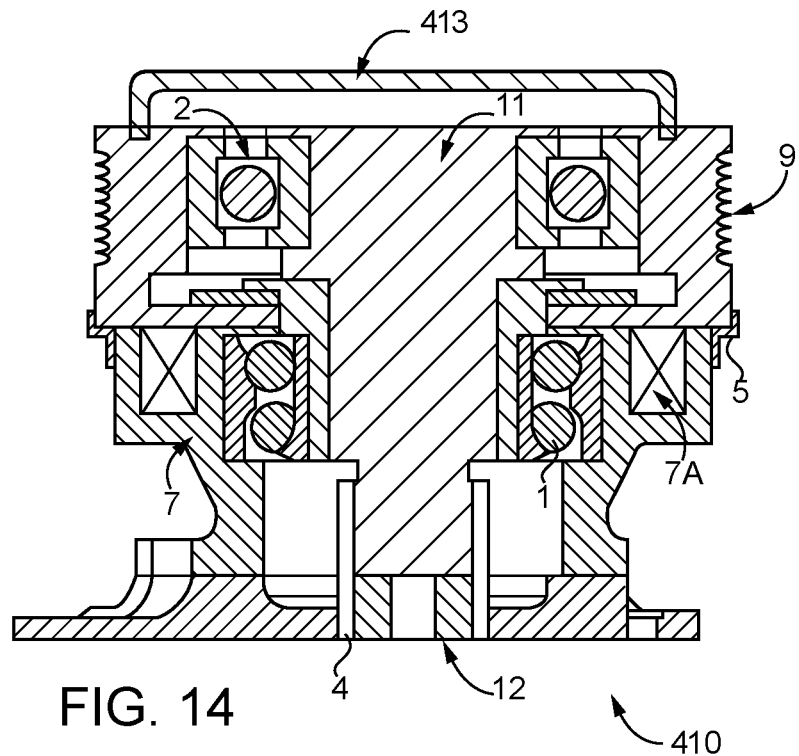
FIG. 14 is a sectional view of a portion of a multi-accessory drive system according to a further exemplary embodiment.
Figure 15:
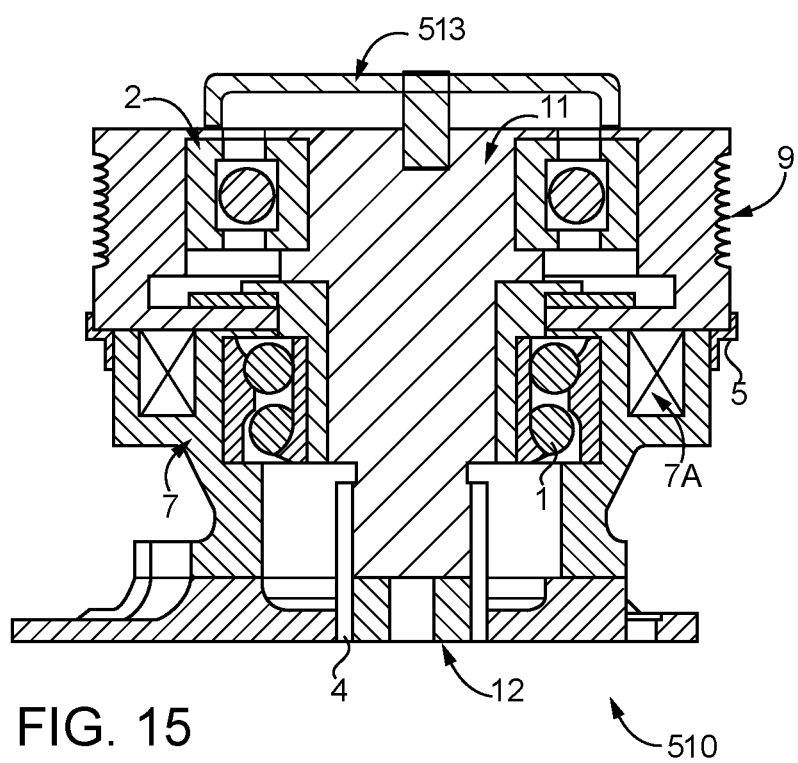
FIG. 15 is a sectional view of a portion of a multi-accessory drive system according to a further exemplary embodiment.

In certain embodiments, rotary accessory drive member 10 may be absent and a dust cover may be coupled with rotary accessory drive member 9, drive shaft 11 or other components of the accessory drive system. In certain embodiments, rotary accessory drive member 10 may be attachable and detachable from drive shaft 11 and, when detached, the dust cover may be coupled with rotary accessory drive member 9. Non-limiting examples of additional embodiments including such features are illustrated in FIGS. 14 and 15 which depict sectional views of accessory drive systems 410 and 510, respectively. Accessory drive system 410 and accessory drive system 510 include a number of features similar to system 110 illustrated and described in connection with FIG. 8. Similar features among these several illustrated embodiments are labeled with the same reference numerals. Accessory drive system 410 is illustrated without accessory drive member 10 and includes a dust cover 413 which is coupled with rotary accessory drive member 9. Accessory drive system 510 is illustrated without accessory drive member 10 and includes a dust cover 413 which is coupled with drive shaft 11 and is provided with a seal at its periphery adjacent accessory drive member 9. In certain forms dust covers 413 and 513 may be provided in detachable configuration allowing the addition of an additional accessory drive member similar to accessory drive member 10.

System 110 further includes a coil housing 7 which contains a conductive coil 7A. Housing 7 is attached to gear cover 6 which, in turn, is coupled with engine 100 to cover a gear train thereof. Housing 7 is adjacent to rotary accessory drive member 9, which is provided as a pulley in the illustrated form, within which armature body 3 and friction plate 8 are disposed. Friction plate 8 comprises a magnetic material body and a friction surface opposing rotary accessory drive member 9. Armature body 3 is coupled with and rotates with drive shaft 11. Friction plate 8 is axially moveable relative to drive shaft 11 between a position in which it contacts a friction surface of rotary accessory drive member 9 and a position in which it is spaced apart from the opposing interior friction surface of rotary accessory drive member 9. In the illustrated embodiment, friction plate 8 is spring-biased toward a disengaged state in which friction plate 8 does not engage rotary accessory drive member 9 to cause rotation thereof. Spring biasing is provided by a plurality of springs 13 which are distributed circumferentially around the central hub portion of armature body 3 and extend between and are coupled with friction plate 8 and the opposing flange portion of armature body 3, which are configured as leaf springs in the illustrated form. Springs 13 are coupled with friction plate 8 and an opposing portion of armature body 3 and have a spring characteristic effective to bias friction plate 8 to a disengaged state, i.e., toward armature body 3 and away from rotary accessory drive member 9. In further embodiments, springs 13 may also be provided as other types of springs, for example, ring springs, rivet damper springs, eye spring arrangements such as three-eye and five-eye arrangements, and annular ring torque cushion (ARTC) springs. Each of these types of spring arrangements can be provided to provide the biasing and motion of friction plate 8 described herein.

During operation of system 110, a control command is sent by an electronic control system, such as from ECU 102, to energize the coil 7A causing current to flow therethrough. Energizing coil 7A induces axial motion of friction plate 8 effective to urge friction plate 8 into contact with an interior friction surface of rotary accessory drive member 9 and to cause the two structures to rotate together. When engaged, rotary accessory drive member 9 drives belt drive belt 21 which, in turn drives alternator 20 while tensioner 22 maintains appropriate tension in belt 21. In this manner alternator 20 generates electrical power proportional to engine speed when engine 100 is operating and coil 7A is energized to engage the clutch mechanism comprising armature 3 and friction plate 8. It shall be appreciated that the pulley form of rotary accessory drive member 9 is one example of a rotary accessory driving member. In certain embodiments, rotary accessory drive member 9 may be provided and structured as another type of rotary accessory drive such as a driving gear, a chain drive member or a direct drive member. In each instance rotary accessory drive member 9 may have the internal attributes and structures disclosed herein. It shall be further appreciated that rotary accessory drive member 9, as well as the other types of rotary drives, may be provided and structured to drive other types of loads such as compressors, fans or pumps.

In other embodiments, friction plate 8 may be biased toward an engaged state in which friction plate 8 engages on opposing portion of rotary accessory drive member 9 to cause rotation thereof and energizing coil 7A induces axial motion effective to disengage friction plate 8 with an interior friction surface of rotary accessory drive member 9 effective to end torque transfer therebetween. Further embodiments may include a bi-stable armature arrangement wherein the friction plate 8 may be spring biased toward a first position (either to engage or to disengage the friction surface of rotary accessory drive member 9), energizing coil 7A is effective to induce movement of the friction plate 8 to a second position (either to engage or to disengage the friction surface of rotary accessory drive member 9), a permanent magnet is provided to maintain the friction plate 8 in the second position after de-energization of the coil 7A, and energizing coil 7A with an demagnetizing polarity is effective to reduce the holding force of the permanent magnet such that the friction plate returns to the first position.

Figure 9:
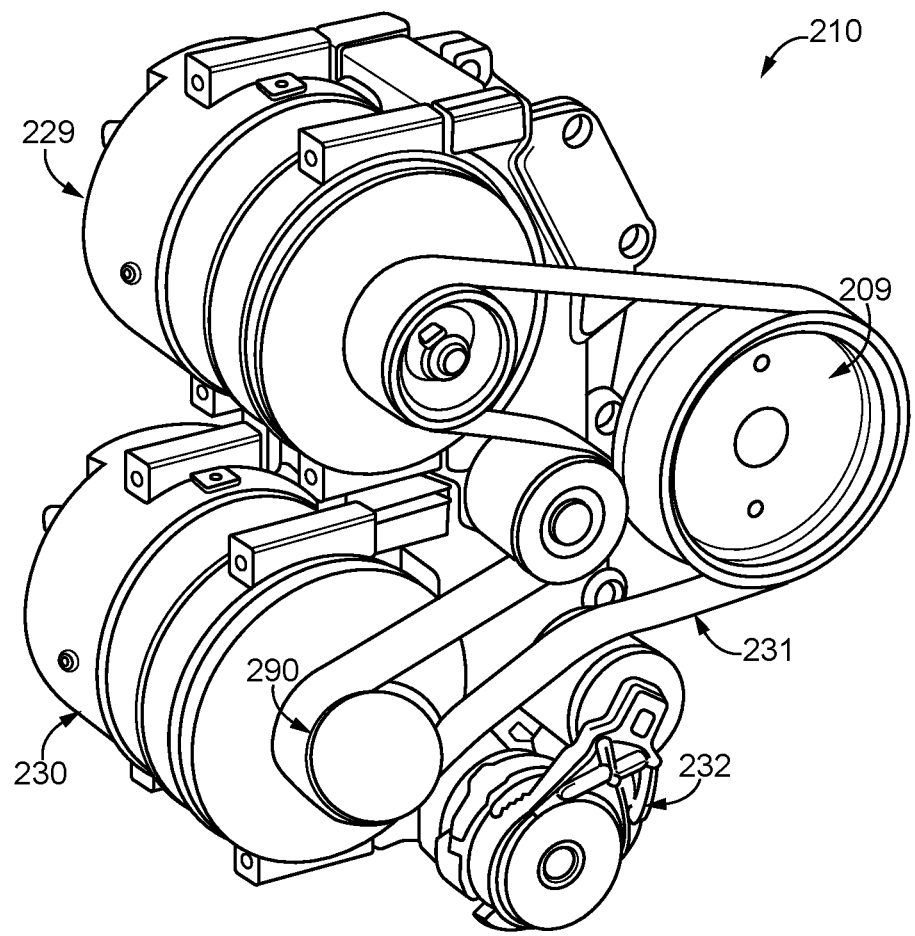
FIG. 9 is a perspective view of a multi-accessory drive system according to another exemplary embodiment.

FIG. 9 is a perspective view of a multi-accessory drive system 210 according to another exemplary embodiment. In the embodiment of FIG. 9, a single pulley 209 is coupled with and driven by an engine output shaft and drives belt 209 which, in turn, drives alternator 229 whenever the engine is operating. Belt 209 is also coupled with clutch 290 of alternator 230 which may include similar internal mechanisms as those described above in connection with FIGS. 2-8. A tensioner 232 is structured to maintain appropriate tension on belt 231. When clutch 290 is engaged, alternator is driven by belt 231. In this manner alternator 230 generates electrical power proportional to engine speed when the engine is operating the clutch 290 is engaged.

Figure 10B:
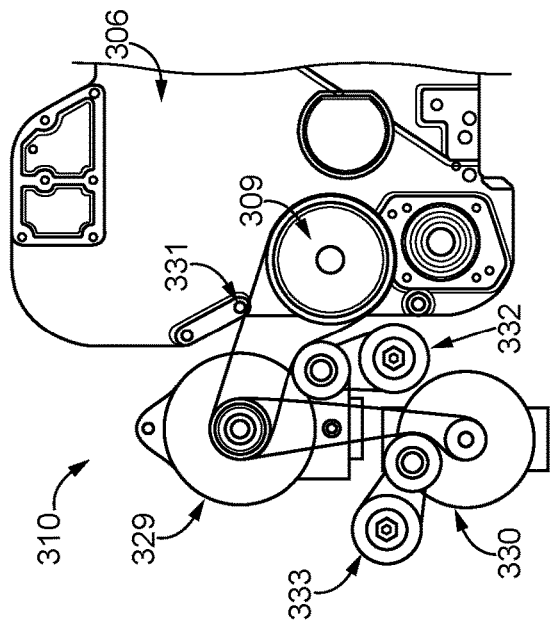
FIGS. 10A-C are perspective, front and plan views, respectively, of a multi-accessory drive system according to a further exemplary embodiment.
Figure 10C:
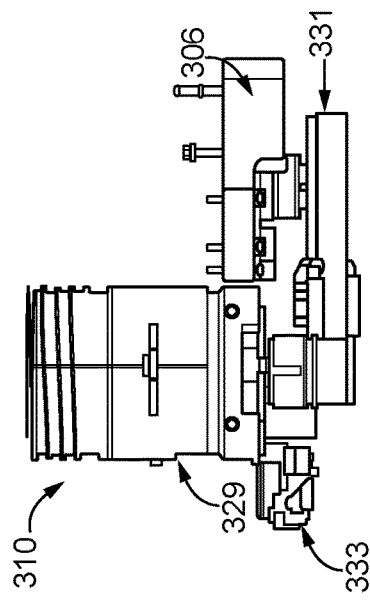
Figure 10A:
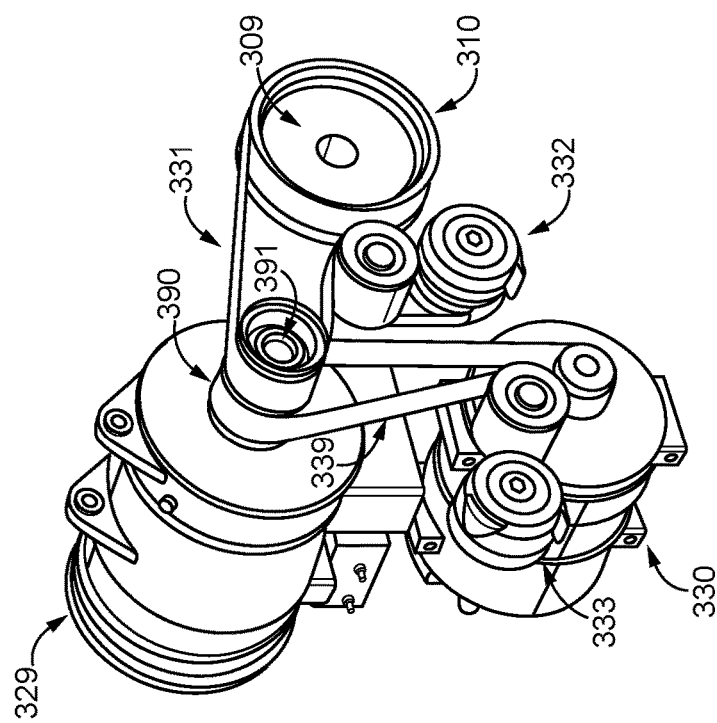

FIGS. 10A-C are perspective, front and plan views, respectively, of a multi-accessory drive system 310 according to another exemplary embodiment. In the embodiment of FIGS. 10A-C, a single pulley 309 is coupled with and driven by an engine output shaft and to drive belt 331 which in turn drives fixed pulley 391 to drive alternator 329 whenever the engine is operating. A tensioner 332 is structured to maintain appropriate tension on belt 331. A clutched pulley 390 is positioned adjacent to fixed pulley 319 and may include similar internal mechanisms as those described above in connection with FIGS. 2-8 such that clutched pulley 390 is selectably engageable to rotate with fixed pulley 391. Clutched pulley 390 is coupled with belt 339 which is, in turn coupled with alternator 330. A tensioner 333 is structured to maintain appropriate tension on belt 339. When the clutch mechanism of clutched pulley 390 is engaged, clutched pulley 391 will drive belt 339 which, in turn, drives alternator 330. In this manner alternator 330 generates electrical power proportional to engine speed when the engine is operating the clutch 390 is engaged. It shall be appreciated that the variations and additions described in connection with FIGS. 1-8 apply mutatis mutandis to the embodiments of FIGS. 9 and 10A-10C.

Figure 11:
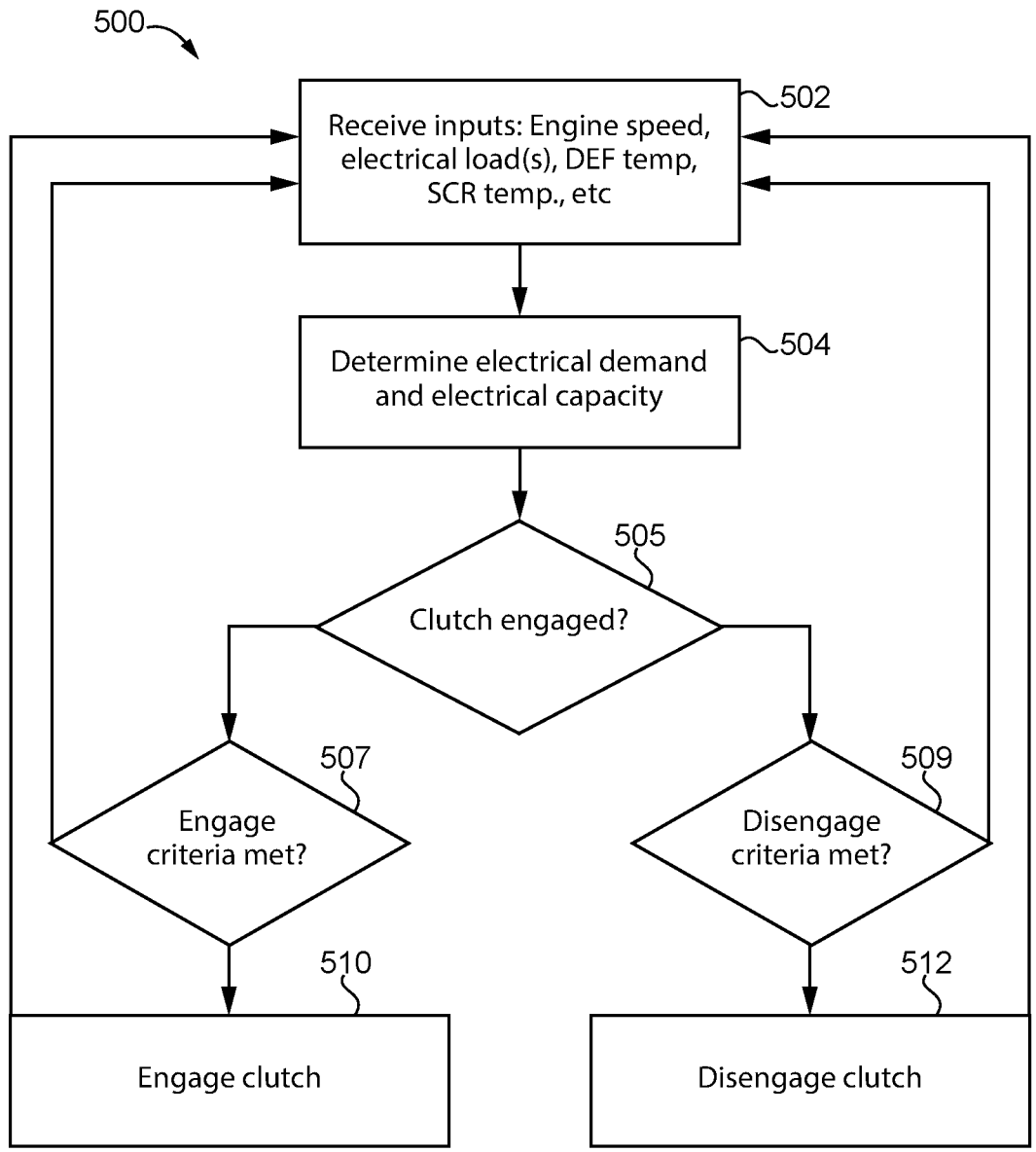
FIG. 11 is a flow diagram illustrating exemplary control process which may be used in connection with any the apparatuses and systems disclosed herein.
Figure 12:
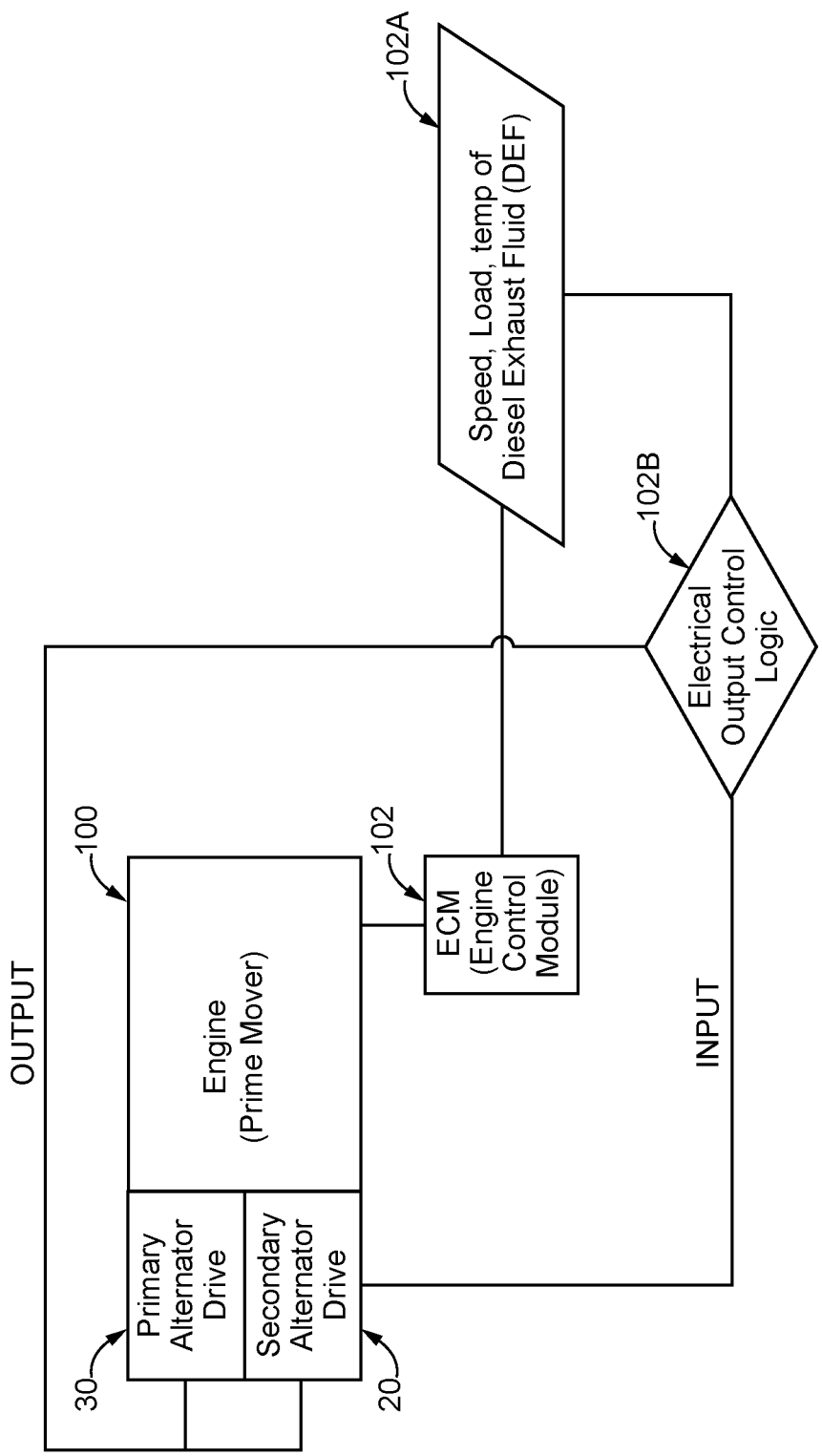
FIG. 12 is a block diagram illustrating an exemplary control system which may be used in connection with any the apparatuses and systems disclosed herein.

FIG. 11 is a block diagram illustrating exemplary control process 500 useful in connection with the apparatuses and systems disclosed herein. Control process 500 may be implemented in ECU 102 described above in connection with FIG. 1 or in a variety of other electronic control systems and devices. In one form, process 500 is implemented in the control system illustrated in FIG. 12 which schematically depicts engine 100, primary alternator 30, secondary alternator 20, and ECU 102 including speed, load, and temperature determination logic 102a and electrical output control logic 102b implemented therein or in other electronic control system components in operative communication with ECU 102. Process 500 is described in connection with a dual-alternator form of a multi-accessory drive system. It shall be appreciated that process 500 may also be applied to other forms of multi-accessory drive systems with certain variations exemplary aspects of which are described below.

In the illustrated form, process 500 is operable to selectably engage and disengage a secondary alternator when demands on the electrical power supply system are such that additional or less electrical power output is required. In general, process 500 reviews power or current demands and engages if further power or current supply is required through the changing electrical demand associated with the duty cycle and environment. More specifically, at operation 502 process 500 receives inputs from a number of engine systems. In the illustrated embodiment the inputs received include engine speed, the electrical loads being placed on the alternator system, DEF temperature and SCR temperature. A variety of other information pertaining to current or future predicted or prognosticated electrical loads placed on the alternator system may also be received including the demand of a variety of electrified engine accessory systems, and vehicle electrical systems. In other forms process 500 is operable to selectably engage and disengage a secondary accessory drive depending on whether load demand of one or more mechanically driven secondary accessories is present. In general, process 500 reviews load demands on the one or more mechanically driven secondary accessories and engages if further supply is required through the changing accessory load demand associated with the duty cycle and environment. More specifically, at operation 502 process 500 receives inputs from a number of systems. In one form, the inputs received include pressure of an auxiliary compressor, hydraulic system or demand of a power take off system. A variety of other information pertaining to current or future predicted or prognosticated mechanical loads placed on such systems may also be received.

From operation 502, process 500 proceeds to operation 504 which determines the electrical demand being placed upon the alternator system by the engine and vehicle systems for which information was received at operation 502. Operation 504 also determines the electrical power generating capacity of the alternator system based on current engine operating conditions the capacity of a primary alternator and the engagement or disengagement state of a second, selectably engageable alternator. Operation 504 may determine the power generating capacity utilizing a lookup table storing power generation capacity as a function of engine speed for the primary alternator individually and for both the primary and secondary alternators in combinations. Additional and alternate techniques and control logic may be utilized as would occur to one of skill in the art with the benefit of the present disclosure. In other forms, operation 504 which determines the load demand being placed upon a mechanically driven accessory system for which information was received at operation 502.

Figure 13:
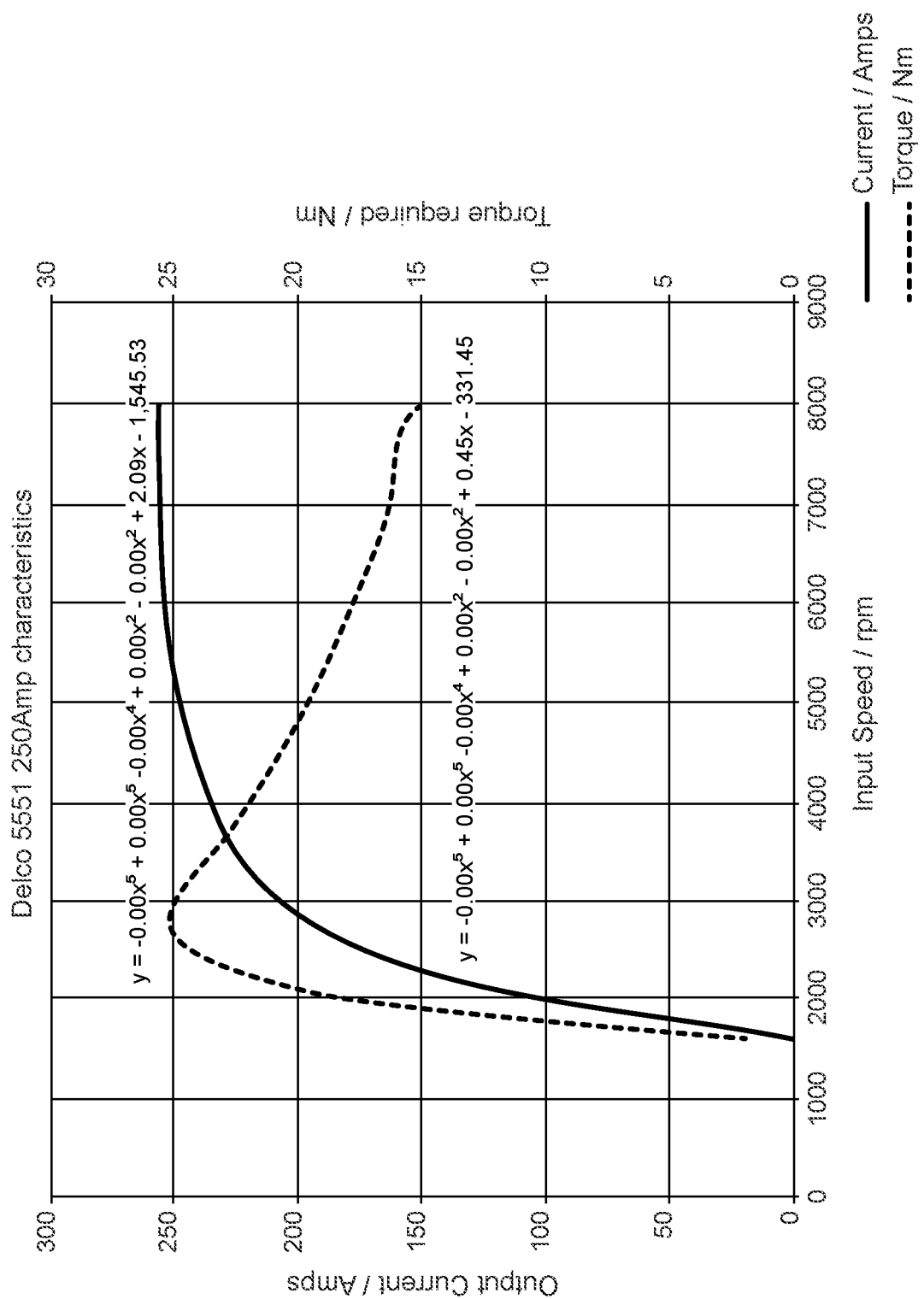
FIG. 13 is a graph illustrating an engine torque as a function of engine speed and electrical power generation capacity as a function of engine speed.

From operation 505, process 500 proceeds to conditional 505 which evaluates whether a clutch that controls the selectable engagement or disengagement of the second alternator is engaged. If the clutch is not engaged, process 500 proceeds to conditional 507 which evaluates whether clutch engagement criteria are met. A variety of clutch engagement criteria may be utilized. In one example, information illustrated in the graph of FIG. 13 may be utilized by evaluating whether the demanded electrical power exceeds the available power generating capacity at a given engine speed (or exceeds a threshold and/or hysteresis implemented relative thereto). Further embodiments may make predictions about future engine speed, power demand, or other operating parameters and engage the clutch depending on such prognostics. If conditional 507 evaluates that the clutch engagement criteria are met, process 500 proceeds to operation 510 which issues a command to engage the clutch, for example, by energizing a coil of an electromechanical clutch as described herein, and then returns to operation 502. If conditional 507 evaluates that the clutch engagement criteria are not met, process 500 returns to operation 502. In other forms an engagement/disengagement decision may be made based on the presence/absence of one or more electrical or mechanical loads. For example, in systems with SCR exhaust aftertreatment the engagement decision may be based upon whether urea or DEF heating elements are on, in which case engagement may be commanded, or off, in which case disengagement may be commanded. In the case of a mechanically driven load such as an air compressor the engagement decision may be based upon whether a predetermined load demand criterion for the air compressor system is satisfied and engagement or disengagement may be commanded depending on whether the criterion is satisfied.

If conditional 505 evaluates that the clutch is engaged, process 500 proceeds to conditional 509 which evaluates whether clutch disengagement criteria are met. A variety of clutch disengagement criteria may be utilized. In one example, information similar to that illustrated in the graph of FIG. 13 but providing the combined generating capacity of a primary and secondary alternator may be utilized by evaluating whether the demanded electrical power is lower than the available power generating capacity at a given engine speed (or lower than a threshold and/or hysteresis implemented relative thereto). Further embodiments may make predictions about future engine speed, power demand, or other operating parameters and disengage the clutch depending on such prognostics. If conditional 509 evaluates that the clutch disengagement criteria are met, process 500 proceeds to operation 512 which issues a command to disengage engage the clutch, for example, by de-energizing a coil of an electromechanical clutch as described herein or by energizing a coil structured to disengage the clutch, and then returns to operation 502. If conditional 509 evaluates that the clutch disengagement criteria are not met, process 500 returns to operation 502.

Further aspects of exemplary embodiments in accordance with the present disclosure shall now be described. One exemplary embodiment is a system comprising: a prime mover including an output shaft structured to output torque; an accessory drive system including a selectably engageable accessory drive member structured to be selectably coupled with and selectably driven by torque from the output shaft, and an electronically controllable electromagnetic clutch including a friction plate provided internally within the accessory drive system and structured to selectably couple and decouple the second accessory drive member with the output shaft via electromagnetically induced axial motion of the friction plate between a first axial position wherein the friction plate is spaced apart from an opposing surface of the selectably engageable accessory drive member and a second axial position wherein the friction plate contacts the opposing surface of the selectably engageable accessory drive member, the friction plate being sealed internally within the accessory drive system; and a controller in operative communication with the prime mover system and structured to selectably control the electromagnetic clutch effective to move the friction plate between the first position and the second position.

In certain forms the accessory drive system includes a bearing contacting a first portion of the selectably engageable accessory drive member, contacting a housing and being sealed internally within the accessory drive system intermediate the first portion and the housing. In certain forms the accessory drive system includes a drive shaft fixedly coupled with the output shaft, a bearing contacting the drive shaft, contacting the selectably engageable drive member and being and being sealed internally within the accessory drive system intermediate the drive shaft and the selectably engageable drive member. In certain forms the accessory drive system includes an armature coupled with the drive shaft, and the friction plate is coupled with the armature by one or more springs. In certain forms the selectably engageable accessory drive member comprises a pulley. In certain forms the accessory drive system includes a fixedly engaged accessory drive member fixedly coupled with the drive shaft and positioned adjacent the selectably engageable accessory drive member. In certain forms the fixedly engaged accessory drive member is attachable and detachable from the drive shaft to selectably provide a single accessory drive system and a dual accessory drive system. In certain forms the accessory drive system includes a fixedly engaged accessory drive member fixedly coupled with the drive shaft. In certain forms the selectably engageable accessory drive member is structured to drive a first alternator and the fixedly engaged accessory drive member is structured to drive a second alternator. In certain forms the controller is structured to evaluate power demand and power production capability parameters of the system and to control the electromagnetic clutch to engage or disengage in response to the evaluation.

Another exemplary embodiment is a system comprising: a prime mover including an output shaft structured to output torque; an accessory drive system including a first accessory drive member fixedly coupled with and structured to be driven by torque from the output shaft, a second accessory drive member structured to be selectably coupled with and selectably driven by torque from the output shaft, and an electronically controllable electromagnetic clutch including a friction plate provided internally within the accessory drive system and structured to selectably couple and decouple the second accessory drive member with the output shaft via electromagnetically induced axial motion of the friction plate between a first axial position wherein the friction plate is spaced apart from an opposing surface of the second accessory drive member and a second axial position wherein the friction plate contacts the opposing surface of the second accessory drive member; and a controller in operative communication with the prime mover system and structured to selectably control the electromagnetic clutch to move the friction plate between the first position and the second position.

In certain forms the friction plate is sealed internally within the accessory drive system. In certain forms the accessory drive system includes a drive shaft fixedly coupled with the output shaft and the first accessory drive member, a first bearing intermediate the drive shaft and the first accessory drive member, an armature coupled with the drive shaft, a friction plate coupled with the armature by one or more springs. In certain forms the accessory drive system comprises a pulley system including the first accessory drive member provided as a first pulley and the second accessory drive member provided as a second pulley, the first pulley and the second pulley structured to rotate about a common axis, and the electromagnetic clutch is contained internally integrated within the second pulley. In certain forms the accessory drive system comprises a pulley system including the first accessory drive member provided as a first pulley operatively coupled with a first alternator and a second alternator by a belt. In certain forms the clutch is contained internally within one of the first alternator and the second alternator. In certain forms the accessory drive system comprises a pulley system including the first accessory drive member provided as a first pulley operatively coupled the output shaft, the second accessory drive member provided as a second pulley operatively coupled with the first pulley by a belt and operatively coupled with a first alternator, a third pulley operatively coupled with the second pulley and the first alternator, and a fourth pulley operatively coupled with a second alternator and operatively coupled with the third pulley by a belt. In certain forms the clutch is integrated within the third pulley. In certain forms the prime mover comprises an internal combustion engine. In certain forms the accessory drive system comprises one or more of a belt drive, a chain drive, a direct drive and a gear drive.

Another exemplary embodiment is a method comprising: operating a system including internal combustion engine including an output shaft, a pulley system structured to be driven by the output shaft, a first alternator and a second alternator structured to be driven by the pulley system, and an electromagnetic clutch integrated within one of the pulley system, the first alternator and the second alternator and structured to selectably couple and decouple at least one of the first alternator and the second alternator from the output shaft; evaluating an electrical power requirement of the system and an electrical power capacity of the system; commanding engagement of the electromagnetic clutch effective to operate the second alternator in response to the evaluation to indicating a need for increased electrical power; and commanding disengagement of the electromagnetic clutch effective disengage engage the second alternator in response to the evaluation to indicating a need for increased electrical power.

In certain forms the act of evaluating an electrical power requirement of the system comprises receiving information of electrical power demand for a plurality of systems or components. In certain forms the plurality of systems or components comprise or more of an aftertreatment system catalyst heater and an aqueous urea solution heater. In certain forms the act of evaluating an electrical power capacity of the system comprises determining an alternator electrical power generating capacity as a function of engine speed. In certain forms the determining an alternator electrical power generating capacity as a function of engine speed is performed using a lookup table. In certain forms the act of commanding engagement of the electromagnetic clutch comprises energizing a conductive coil. In certain forms the act of commanding disengagement of the electromagnetic clutch comprises de-energizing a conductive coil.

Another exemplary embodiment is a system comprising: an internal combustion engine including an output shaft; a pulley system structured to be driven by the output shaft; a first alternator and a second alternator structured to be driven by the pulley system; and an electromagnetic clutch integrated within one of the pulley system, the first alternator and the second alternator and structured to selectably couple and decouple at least one of the first alternator and the second alternator from the output shaft; a controller in operative communication with the internal combustion engine system and structured to evaluate power demand and power production capability parameters of the system and to control the electromagnetic clutch to engage or disengage in response to the evaluation.

In certain forms the pulley system comprises a first pulley and a second pulley structured to rotate about a common axis. In certain forms the electromagnetic clutch is integrated within the second pulley. In certain forms the electromagnetic clutch includes an armature structured move axially to engage and disengage an interior surface of the second pulley and a coil structured to electromagnetically induce movement of the armature. In certain forms the pulley system comprises a first pulley operatively coupled with the first alternator and the second alternator by a belt. In certain forms the clutch is integrated within one of the first alternator and the second alternator. In certain forms the pulley system comprises a first pulley operatively coupled the output shaft, a second pulley operatively coupled with the first pulley by a belt and operatively coupled with the first alternator, a third pulley operatively coupled with the second pulley and the first alternator, and a fourth pulley operatively coupled the second alternator and operatively coupled with the third pulley by a belt. In certain forms the clutch is integrated within the third pulley.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method comprising:
operating a system including internal combustion engine including an output shaft, a pulley system structured to be driven by the output shaft, a first alternator and a second alternator structured to be driven by the pulley system, and an electromagnetic clutch integrated within one of the pulley system, the first alternator and the second alternator and structured to selectably couple and decouple at least one of the first alternator and the second alternator from the output shaft in response to control commands from an electronic control system operatively coupled with the first alternator and the second alternator;

evaluating with the electronic control system an electrical power requirement of the system and an electrical power capacity of the system;

commanding with the electronic control system engagement of the electromagnetic clutch effective to operate the second alternator in response to the evaluation to indicating a need for increased electrical power; and commanding with the electronic control system disengagement of the electromagnetic clutch effective to disengage the second alternator in response to the evaluation not indicating a need for increased electrical power.

2. The method of claim 1 wherein the act of evaluating an electrical power requirement of the system comprises receiving information of electrical power demand for a plurality of systems or components.

3. The method of claim 1 wherein the plurality of systems or components comprise or more of an aftertreatment system catalyst heater and an aqueous urea solution heater.

4. The method of claim 1 wherein the act of evaluating an electrical power capacity of the system comprises determining an alternator electrical power generating capacity as a function of engine speed.

5. The method of claim 4 wherein the determining an alternator electrical power generating capacity as a function of engine speed is performed using a lookup table.

6. The method of claim 1 wherein the act of commanding engagement of the electromagnetic clutch comprises energizing a conductive coil.

7. The method of claim 1 wherein the act of commanding disengagement of the electromagnetic clutch comprises de-energizing a conductive coil.

8. A system comprising:
an internal combustion engine including an output shaft, a pulley system structured to be driven by the output shaft, a first alternator and a second alternator structured to be driven by the pulley system, and an electromagnetic clutch integrated within one of the pulley system, the first alternator and the second alternator and structured to selectably couple and decouple at least one of the first alternator and the second alternator from the output shaft; and an electronic control unit configured to perform the acts of:

evaluating an electrical power requirement of the system and an electrical power capacity of the system;

commanding engagement of the electromagnetic clutch effective to operate the second alternator in response to the evaluation to indicating a need for increased electrical power; and commanding disengagement of the electromagnetic clutch effective to disengage the second alternator in response to the evaluation not indicating a need for increased electrical power.

9. The system of claim 8 wherein the act of evaluating an electrical power requirement of the system comprises receiving information of electrical power demand for a plurality of systems or components.

10. The system of claim 8 wherein the plurality of systems or components comprise or more of an aftertreatment system catalyst heater and an aqueous urea solution heater.

11. The system of claim 8 wherein the act of evaluating an electrical power capacity of the system comprises determining an alternator electrical power generating capacity as a function of engine speed.

12. The system of claim 11 wherein the determining an alternator electrical power generating capacity as a function of engine speed is performed using a lookup table.

13. The system of claim 8 wherein the act of commanding engagement of the electromagnetic clutch comprises energizing a conductive coil.

14. The system of claim 8 wherein the act of commanding disengagement of the electromagnetic clutch comprises de-energizing a conductive coil.

* * * * *